US005376494A

United States Patent [19]

Mahabadi et al.

[11] Patent Number: 5,376,494

[45] Date of Patent: Dec. 27, 1994

[54] REACTIVE MELT MIXING PROCESS FOR PREPARING CROSS-LINKED TONER RESIN

[75] Inventors: Hadi K. Mahabadi, Etobicoke; Enno E. Agur, Toronto; Gerald R. Allison, Oakville; Michael S. Hawkins, Mississauga; Stephan Drappel, Toronto; Maria N. V. McDougall, Burlington, all of Canada; Bernard Grushkin, Pittsford, N.Y.; Thomas R. Hoffend, Webster, N.Y.; Angelo J. Barbetta, Penfield, N.Y.

[73] Assignee: Xerox Corporation, Stamford, Conn.

[21] Appl. No.: 814,641

[22] Filed: Dec. 30, 1991

[51] Int. Cl.[5] ......................... G03G 5/00; C08G 63/52

[52] U.S. Cl. ..................................... 430/137; 528/272; 528/296; 528/297; 528/299; 528/300; 528/301; 528/303; 528/306; 528/308; 528/308.6; 528/480; 528/491; 528/503; 525/437; 522/3; 522/6; 522/60; 522/101; 522/104; 430/109; 430/137; 264/13

[58] Field of Search ............... 528/480, 491, 503, 272, 528/296, 297, 299, 300, 301, 303, 306, 308, 308.6; 525/437; 522/3, 6, 60, 101, 104; 430/109, 137; 264/13

[56] References Cited

U.S. PATENT DOCUMENTS

| | | | |
|---|---|---|---|
| 31,072 | 11/1882 | Jadwin et al. | 430/99 |
| 3,590,000 | 6/1971 | Palermiti et al. | 430/110 |
| 3,678,024 | 7/1972 | Liu et al. | 528/481 |
| 3,681,106 | 8/1972 | Burns et al. | 430/120 |
| 3,843,757 | 10/1974 | Ehrenfreund et al. | 264/53 |
| 3,847,604 | 11/1974 | Hagenbach et al. | 96/1 |
| 3,876,736 | 4/1975 | Takiura | 264/40 |
| 3,941,898 | 3/1976 | Sadamatsu et al. | 427/18 |
| 4,089,917 | 5/1978 | Takiura et al. | 264/40.3 |
| 4,289,716 | 9/1981 | Voigt | 264/45.9 |
| 4,298,672 | 11/1981 | Lu | 430/108 |
| 4,338,390 | 7/1982 | Lu | 430/106 |
| 4,387,211 | 6/1983 | Yasuda et al. | 528/179 |
| 4,513,074 | 4/1985 | Nash et al. | 430/106.6 |
| 4,533,614 | 8/1985 | Fukumoto et al. | 430/99 |
| 4,556,624 | 12/1985 | Gruber et al. | 430/110 |
| 4,604,338 | 8/1986 | Gruber et al. | 430/106 |
| 4,788,122 | 11/1988 | Kawabe et al. | 430/109 |
| 4,797,339 | 1/1989 | Maruyama et al. | 430/109 |
| 4,804,622 | 2/1989 | Tanaka et al. | 430/109 |
| 4,824,750 | 4/1989 | Mahalek et al. | 430/99 |
| 4,845,002 | 7/1989 | Niki et al. | 430/109 |
| 4,894,308 | 1/1990 | Mahabadi et al. | 430/137 |
| 4,935,326 | 6/1990 | Creatura et al. | 430/108 |
| 4,937,166 | 6/1990 | Creatura et al. | 430/108 |
| 4,973,439 | 11/1990 | Chang et al. | 264/101 |
| 4,990,293 | 2/1991 | Macosko et al. | 264/40.1 |
| 5,015,724 | 5/1991 | Kawabe | 528/272 |
| 5,057,392 | 10/1991 | McCabe et al. | 430/109 |
| 5,089,547 | 2/1992 | McCabe et al. | 524/262 |
| 5,112,715 | 5/1992 | DeMejo et al. | 430/109 |
| 5,145,762 | 9/1992 | Grushkin | 430/137 |

FOREIGN PATENT DOCUMENTS

| | | |
|---|---|---|
| 55-166651 | 12/1980 | Japan . |
| 56-94361 | 7/1981 | Japan . |
| 56-116041 | 9/1981 | Japan . |

OTHER PUBLICATIONS

Japanese Abstract 1-38757, vol. 13, No. 228 (May 26, 1989), "Thermosetting Powdery Toner for Developing Electrostatic Charge image".

Japanese Abstract 60-104956, vol. 9, No. 253 (Oct. 11, 1985), "Toner".

Japanese Abstract 48-158651, vol. 7, No. 282 (Dec. 16, 1983), "Electrophotographic Toner".

Japanese Abstract 57-81272, vol. 6, No. 162 (Aug. 25, 1982), "Pressure Fixable Toner".

*Primary Examiner*—Samuel A. Acquah
*Attorney, Agent, or Firm*—Oliff & Berridge

[57] ABSTRACT

Low fix temperature toner resins are fabricated by a reactive melt mixing process wherein polymer resins are cross-linked at high temperature and high shear. The resins are particularly suitable for high speed fusing, show excellent offset resistance and wide fusing latitude and superior vinyl offset properties.

33 Claims, 3 Drawing Sheets

REACTIVE MELT MIXING PROCESS FOR PREPARING CROSS-LINKED TONER RESIN

The present invention is generally directed to processes for the preparation of toner resins and toners. More specifically, the present invention relates to melt mixing processes, batch or continuous, but preferably continuous processes such as, for example, reactive extrusion for preparing cross-linked toner resins. Yet more specifically, the present invention relates to processes for cross-linking reactive linear resins for the preparation of cross-linked toner resins that can be selected for application in heat fixable toners with superior fusing and vinyl offset performance.

BACKGROUND

Toner utilized in development in the electrographic process is generally prepared by mixing and dispersing a colorant and a charge enhancing additive into a thermoplastic binder resin, followed by micropulverization. As the thermoplastic binder resin, several polymers are known, including polystyrenes, styrene-acrylic resins, styrene-methacrylic resins, polyesters, epoxy resins, acrylics, urethanes and copolymers thereof. As the colorant, carbon black is utilized often, and as the charge enhancing additive, alkyl pyridinium halides, distearyl dimethyl ammonium methyl sulfate, and the like are known.

To fix the toner to a support medium, such as a sheet of paper or transparency, hot roll fixing is commonly used. In this method, the support medium carrying a toner image is transported between a heated fuser roll and a pressure roll, with the image face contacting the fuser roll. Upon contact with the heated fuser roll, the toner melts and adheres to the support medium, forming a fixed image. Such a fixing system is very advantageous in heat transfer efficiency and is especially suited for high speed electrophotographic processes.

Fixing performance of the toner can be characterized as a function of temperature. The lowest temperature at which the toner adheres to the support medium is called the Cold Offset Temperature (COT), and the maximum temperature at which the toner does not adhere to the fuser roll is called the Hot Offset Temperature (HOT). When the fuser temperature exceeds HOT, some of the molten toner adheres to the fuser roll during fixing and is transferred to subsequent substrates containing developed images, resulting for example in blurred images. This undesirable phenomenon is called offsetting. Between the COT and HOT of the toner, is the Minimum Fix Temperature (MFT) which is the minimum temperature at which acceptable adhesion of the toner to the support medium occurs, as determined by, for example, a creasing test. The difference between MFT and HOT is called the Fusing Latitude.

The hot roll fixing system and a number of toners used therein, however, exhibit several problems. First, the binder resins in the toners can require a relatively high temperature in order to be affixed to the support medium. This may result in high power consumption, low fixing speeds, and reduced life of the fuser roll and fuser roll bearings. Second, offsetting can be a problem. Third, toners containing vinyl type binder resins such as styrene-acrylic resins may have an additional problem which is known as vinyl offset. Vinyl offset occurs when a sheet of paper or transparency with a fixed toner image comes in contact for a period of time with a polyvinyl chloride (PVC) surface containing a plasticizer used in making the vinyl material flexible such as, for example, in vinyl binder covers, and the fixed image adheres to the PVC surface.

There is a need for a toner resin with low fix temperature and high offset temperature (or wide fusing latitude) and superior vinyl offset property, and processes for the preparation of such a resin.

In order to prepare lower fix temperature resins for toner,the molecular weight of the resin may be lowered. Low molecular weight and amorphous polyester resins and epoxy resins have been used to prepare low temperature fixing toners. For example, attempts to produce toners utilizing polyester resins as binder are disclosed in U.S. Pat. No. 3,590,000 to Palermiti et al. and U.S. Pat. No. 3,681,106 to Burns et al. The minimum fixing temperature of polyester binder resins can be rendered lower than that of other materials, such as styrene-acrylic resins. However, this may lead to a lowering of the hot offset temperature and, as a result, decreased offset resistance. In addition, the glass transition temperature of the resin may be decreased, which may cause the undesirable phenomenon of blocking of the toner during storage.

To prevent fuser roll offsetting and to increase fusing latitude of toners, modification of the binder resin structure by conventional polymerization processes (i.e., by branching, cross-linking, and the like) has been attempted. For example, in U.S. Pat. No. 3,681,106 to Burns et al., a process is disclosed whereby a polyester resin was improved with respect to offset resistance by nonlinearly modifying the polymer backbone by mixing a trivalent or more polyol or polyacid with the monomer to generate branching during polycondensation. However, an increase in degree of branching may result in an elevation of the minimum fix temperature. Thus, any initial advantage of low temperature fix may be diminished.

Another method of improving offset resistance is by cross-linking during polymerization. In U.S. Pat. No. 3,941,898 to Sadamatsu et al., for example, a cross-linked vinyl type polymer prepared using conventional cross-linking was used as the binder resin. Similar disclosures for vinyl type resins are presented in U.S. Pat. No. Re. 31,072 (a reissue of U.S. Pat. No. 3,938,992) to Jadwin et al., U.S. Pat. No. 4,556,624 to Gruber et al., U.S. Pat. No. 4,604,338 to Gruber et al. and U.S. Pat. No. 4,824,750 to Mahalek et al. Also, disclosures have been made of cross-linked polyester binder resins using conventional polycondensation processes for improving offset resistance, such as for example in U.S. Pat. No. 3,681,106 to Burns et al.

While significant improvements can be obtained in offset resistance and entanglement resistance, a major drawback may ensue with these kinds of cross-linked resins prepared by conventional polymerization, both vinyl type processes including solution, bulk, suspension and emulsion polymerizations and polycondensation processes. In all of these processes, monomer and cross-linking agent are added to the reactor. The cross-linking reaction is not very fast and chains can grow in more than two directions at the cross-linking point by the addition of monomers. Three types of polymer configurations are produced—a linear and soluble portion called the linear portion, a cross-linked portion which is low in cross-linking density and therefore is soluble in some solvents, e.g., tetrahydrofuran, toluene and the like, and is called sol, and a portion comprising highly cross-linked gel particles which is not soluble in substantially any solvent, e.g., tetrahydrofuran, toluene and the like, and is called gel. The second portion with low cross-linking density (sol) is responsible for widening the molecular weight distribution of the soluble part which results in an elevation of the minimum fixing temperature of the toner. Also, a drawback of these processes (which are not carried out under high shear) is that as more cross-linking agent is used the gel particles or very highly cross-linked insoluble polymer with high molecular weight increase in size. The large gels can be more difficult to disperse pigment in, causing unpigmented toner particles during pulverization, and toner developability may thus be hindered. Also, in the case of vinyl polymers, the toners produced often show vinyl offset.

In U.S. Pat. No. 4,533,614 to Fukumoto et al., a process was utilized for preparing loosened cross-linked polyester binder resin which showed low temperature fix and good offset resistance. Metal compounds were used as cross-linking agents. Similar disclosures are presented in U.S. Pat. No. 3,681,106 to Burns et al. and Japanese Laid-open Patent Applications Nos. 94362/1981, 116041/1981 and 166651/1980. As discussed in the '614 patent, incorporation of metal complexes, however, can influence unfavorably the charging properties of the toner. Also, in the case of color toners other than black (e.g., cyan), metal complexes can adversely affect the color of the pigments. It is also known that metal containing toner can have disposal problems in some areas, such as for example in the State of California, U.S.A. Metal complexes are often also expensive materials.

Reactive extrusion processes for producing engineering plastics are known, for both initial polymerization reactions employing monomers or prepolymers, and for polymer modifying reactions, such as graft, coupling and degradation reactions. However, it is believed that the prior art does not disclose the use of a reactive extrusion process to prepare cross-linked thermoplastic resins for use in toners.

In U.S. Pat. No. 4,894,308 to Mahabadi et al. and U.S. Pat. No. 4,973,439 to Chang et al., for example, extrusion processes are disclosed for preparing electrophotographic toner compositions in which pigment and charge control additive were dispersed into the binder resin in the extruder. However, in each of these patents, there is no suggestion of a chemical reaction occurring.

An injection molding process for producing cross-linked synthetic resin molded articles is disclosed in U.S. Pat. No. 3,876,736 to Takiura in which polyolefin or polyvinyl chloride resin and cross-linking agent was mixed in an extruder, and then introduced into an externally heated reaction chamber outside the extruder wherein the cross-linking reaction occurred at increased temperature and pressure, and at low or zero shear.

In U.S. Pat. No. 4,089,917 to Takiura et al., an injection molding and cross-linking process is disclosed in which polyethylene resin and cross-linking agent were mixed in an extruder and reacted in reaction chambers at elevated temperature and pressure. Heating of the resin mixture occurred partially by high shear in inlet flow orifices. However, the cross-linking reaction still took place in the reaction chambers at low or zero shear, and the final product is a thermoset molded part, and thus, is not useful for toner resins.

A process for dispensing premixed reactive precursor polymer mixtures through a die for the purposes of reaction injection molding or coating is described in U.S. Pat. No. 4,990,293 to Macosko et al. in which polyurethane precursor systems were cross-linked in the die and not in the extruder. The dimensions of the die channel were determined such that the value of the wall shear stress was greater than a critical value in order to prevent gel buildup and consequent plugging of the die. The final product is a thermoset molded part, and thus, is not useful for toner resins.

It should be noted that the processes disclosed in U.S. Pat. Nos. 3,876,736, 4,089,917 and 4,990,293 are not reactive extrusion processes, because the cross-linking in each case occurs in a die or a mold, and not in an extruder. These processes are for producing engineering plastics such as thermoset materials which cannot be remelted once molded, and thus are not suitable for toner application.

SUMMARY OF THE INVENTION

Embodiments of the present invention overcome the above-discussed problems in the prior art. The present invention provides a reactive melt mixing process to produce low cost and safe cross-linked thermoplastic binder resins for toner which have low fix temperature and high offset temperature, and which show minimized or substantially no vinyl offset. In this process, polymers are cross-linked in the molten state under high temperature and high shear conditions, producing substantially uniformly dispersed densely cross-linked microgels, preferably using chemical initiators as cross-linking agents in an extruder, preferably without utilizing monomer for cross-linking, and with minimized or no residual materials left in the resin after cross-linking.

The present invention provides an economical, robust and reproducible process for preparing resins for toner, by batch or continuous process. In this process, cross-linking is carried out very quickly to form microgel particles during melt mixing. High shear conditions disperse the microgels substantially uniformly in the polymer melt and prevent the microgels from continuing to increase in size with increasing degree of cross-linking.

In the process of the invention, a reactive resin (hereinafter called base resin) such as, for example, unsaturated linear polyester resin, is cross-linked in the molten state under high temperature and high shear conditions, preferably using a chemical initiator such as, for example, organic peroxide, as a cross-linking agent, in a batch or continuous melt mixing device, without forming any significant amounts of residual materials. Thus, the removal of byproducts or residual unreacted materials is not needed with embodiments of the process of the invention. In preferred embodiments of this process, the base resin and initiator are preblended and fed upstream to a melt mixing device such as an extruder at an upstream location, or the base resin and initiator are fed separately to the melt mixing device, e.g., an extruder at either upstream or downstream locations. An extruder screw configuration, length and temperature may be used which enable the initiator to be well dispersed in the polymer melt before the onset of cross-linking, and further, which provide a sufficient, but short, residence time for the cross-linking reaction to be carried out. Adequate temperature control enables the cross-linking reaction to be carried out in a controlled and reproducible fashion. Extruder screw configuration and length can also provide high shear conditions to distribute microgels, formed during the cross-linking reaction, throughout in the polymer melt, and to keep the microgels from inordinately increasing in size with increasing degree of cross-linking. An optional devolatilization zone may be used to remove any volatiles, if needed. The polymer melt may then be pumped through a die to a pelletizer.

The process of the invention can be utilized to produce a low cost, safe cross-linked toner resin with substantially no unreacted or residual byproducts of cross-linking, and which can be sufficiently fixed at low temperature by hot roll fixing to afford energy saving, is particularly suitable for high speed fixing, shows excellent offset resistance and wide fusing latitude (e.g., low fix temperature and high offset temperature), and shows minimized or no vinyl offset.

DETAILED DESCRIPTION OF PREFERRED EMBODIMENTS

Figure 1:
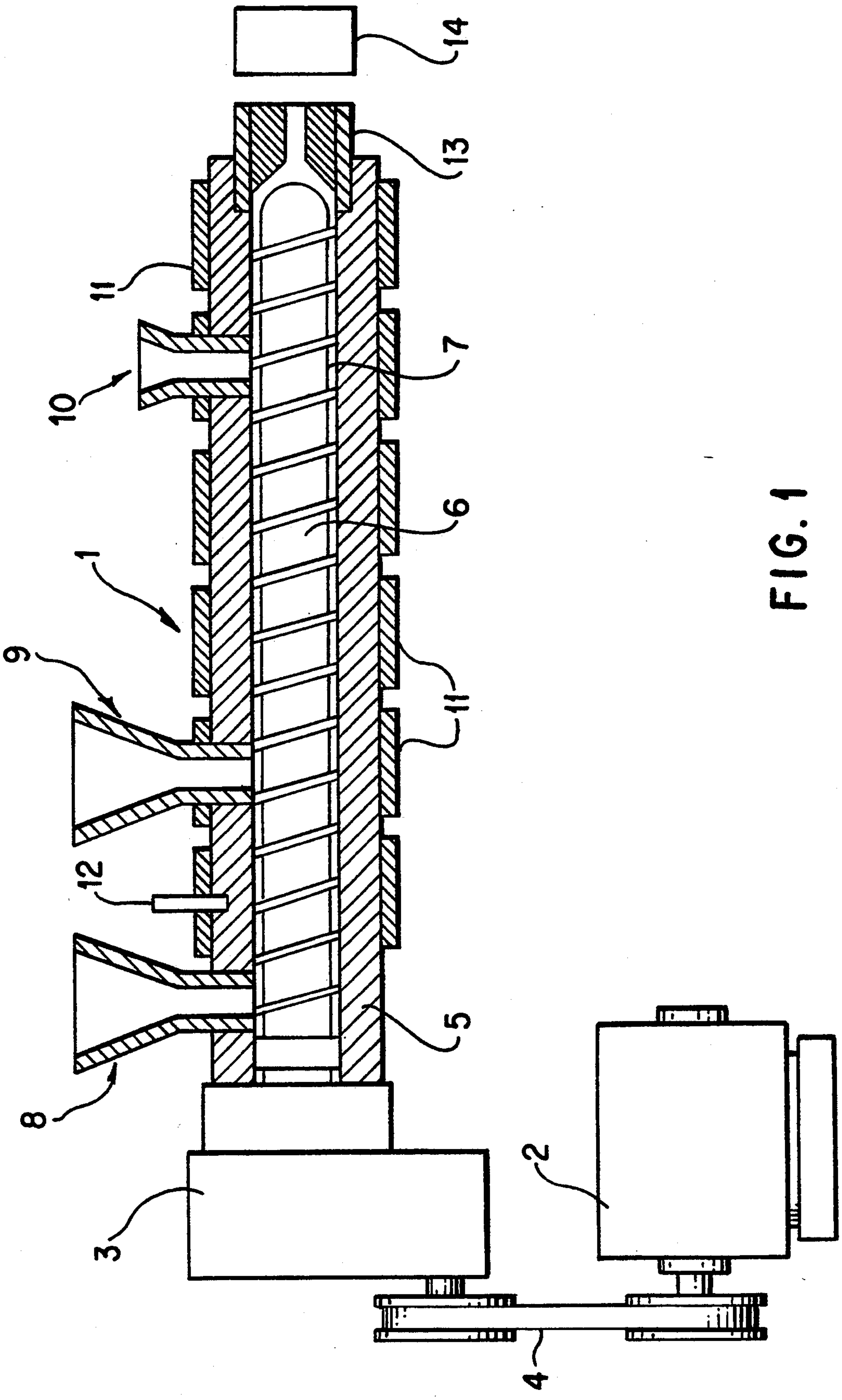
FIG. 1 is a partially schematic cross-sectional view of a reactive extrusion apparatus suitable for the process of the present invention.

The present invention provides a process for fabricating low fix temperature toner resins by reactive melt mixing in any melt mixing device, batch or continuous, but preferably continuous such as, for example, an extruder wherein polymer base resins are cross-linked at high temperature and under high shear conditions, preferably using chemical initiators as cross-linking agents. Cross-linked toner resins prepared by the process of the invention are disclosed in detail in copending application Ser. No. 07/814,782 filed simultaneously herewith and entitled "Cross-linked Toner Resins", the disclosure of which is hereby totally incorporated herein by reference.

Low fix temperature toner resins are fabricated by a reactive melt mixing process comprising the steps of: (1) melting base resin, thereby forming a polymer melt, in a melt mixing device; (2) initiating cross-linking of the polymer melt, preferably with a chemical initiator and increased reaction temperature; (3) keeping the polymer melt in the melt mixing devices for a sufficient residence time that partial cross-linking of the base resin may be achieved; (4) providing sufficiently high shear during the cross-linking reaction, thereby keeping gel particles formed during cross-linking small in size and well distributed in the polymer melt, and (5) optionally devolatilizing the melt to remove any effluent volatiles.

In a preferred embodiment, the process comprises the steps of: (1) feeding the base resin and initiator to an extruder; (2) melting the base resin, thereby forming a polymer melt; (3) mixing the molten base resin and initiator at low temperature to enable good dispersion of the initiator in the base resin before the onset of cross-linking; (4) initiating cross-linking of the base resin with the initiator by raising the melt temperature and controlling it along the extruder channel; (5) keeping the polymer melt in the extruder for a sufficient residence time at a given temperature such that the required amount of cross-linking is achieved; (6) providing sufficiently high shear during the cross-linking reaction thereby keeping the gel particles formed during cross-linking small in size and well distributed in the polymer melt; (7) optionally devolatilizing the melt to remove any effluent volatiles; and (8) pumping the cross-linked resin melt through a die to a pelletizer.

In the process of the present invention, the fabrication of the cross-linked resin may be carried out in a melt mixing device such as an extruder described in U.S. Pat. No. 4,894,308 to Mahabadi et al., the disclosure of which is hereby totally incorporated herein by reference. Generally, any high shear, high temperature melt mixing device suitable for processing polymer melts may be employed, provided that the objectives of the present invention are achieved. Examples of continuous melt mixing devices include single screw extruders or twin screw extruders, continuous internal mixers, gear extruders, disc extruders and roll mill extruders. Examples of batch internal melt mixing devices include Banbury mixers, Brabender mixers and Haake mixers.

One suitable type of extruder is the fully intermeshing corotating twin screw extruder such as, for example, the ZSK-30 twin screw extruder, available from Werner & Pfleiderer Corporation, Ramsey, New Jersey, U.S.A., which has a screw diameter of 30.7 millimeters and a length-to-diameter (L/D) ratio of 37.2. The extruder can melt the base resin, mix the initiator into the base resin melt, provide high temperature and adequate residence time for the cross-linking reaction to be carried out, control the reaction temperature via appropriate temperature control along the extruder channel, optionally devolatilize the melt to remove any effluent volatiles if needed, and pump the cross-linked polymer melt through a die such as, for example, a strand die to a pelletizer. For chemical reactions in highly viscous materials, reactive extrusion is particularly efficient, and is advantageous because it requires no solvents, and thus is easily environmentally controlled. It is also advantageous because it permits a high degree of initial mixing of base resin and initiator to take place, and provides an environment wherein a controlled high temperature (adjustable along the length of the extruder) is available so that a very quick reaction can occur. It also enables a reaction to take place continuously, and thus the reaction is not limited by the disadvantages of a batch process, wherein the reaction must be repeatedly stopped so that the reaction products may be removed and the apparatus cleaned and prepared for another similar reaction. As soon as the desired amount of cross-linking is achieved, the reaction products can be immediately removed from the reaction chamber.

For a better understanding of the present invention, a typical reactive extrusion apparatus suitable for the process of the present invention is illustrated in FIG. 1.

FIG. 1 shows a twin screw extrusion device 1 containing a drive motor 2, a gear reducer 3, a drive belt 4, an extruder barrel 5, a screw 6, a screw channel 7, an upstream supply port or hopper 8, a downstream supply port 9, a downstream devolatilizer 10, a heater 11, a thermocouple 12, a die or head pressure generator 13, and a pelletizer 14. The barrel 5 consists of modular barrel sections, each separately heated with heater 11 and temperature controlled by thermocouple 12. With modular barrel sections, it is possible to locate feed ports and devolatilizing ports at required locations, and to provide segregated temperature control along the screw channel 7. The screw 6 is also modular, enabling the screw to be configured with modular screw elements and kneading elements having the appropriate lengths, pitch angles, etc. in such a way as to provide optimum conveying, mixing, reaction, devolatilizing and pumping conditions.

In operation, the components to be reacted and extruded, e.g., the base resin and chemical initiator, enter the extrusion apparatus from the first upstream supply port 8 and/or second downstream supply port 9. The base resin, usually in the form of solid pellets, chips, granules, or other forms can be fed to the first upstream supply port 8 and second downstream supply port 9 by starve feeding, gravity feeding, volumetric feeding, loss-in-weight feeding, or other known feeding methods. Feeding of the chemical initiator to the extruder depends in part on the nature of the initiator. In one embodiment of the invention, especially if the initiator is a solid, the base resin and initiator are preblended prior to being added to the extruder, and the preblend, the base resin and/or additional initiator may be added through either upstream supply port 8, downstream supply port 9, or both. In another embodiment, especially if the initiator is a liquid, the base resin and initiator can preferably be added to the extruder separately through upstream supply port 8, downstream supply port 9, or both. This does not preclude other methods of adding the base resin and initiator to the extruder. After the base resin and initiator have been fed into screw channel 7, the resin is melted and the initiator is dispersed into the molten resin as it is heated, but preferably still at a lower temperature than is need for cross-linking. Heating takes place from two sources: (1) external barrel heating from heaters 11, and (2) internal heating from viscous dissipation within the polymer melt itself. When the temperature of the molten resin and initiator reach a critical point, onset of the cross-linking reaction takes place. It is preferable, although not absolutely necessary, that the time required for completion of the cross-linking reaction not exceed the residence time in the screw channel 7. The rotational speed of the extruder screw preferably ranges from about 50 to about 500 revolutions per minute. If needed, volatiles may be removed through downstream devolatilizer 10 by applying a vacuum. At the end of screw channel 7, the cross-linked resin is pumped in molten form through die 13, such as for example a strand die, to pelletizer 14 such as, for example, a water bath pelletizer, underwater granulator, etc.

With further reference to FIG. 1, the rotational speed of the screw 6 can be of any suitable value provided that the objectives of the present invention are achieved. Generally, the rotational speed of screw 6 is from about 50 revolutions per minute to about 500 revolutions per minute. The barrel temperature, which is controlled by thermocouples 12 and generated in part by heaters 11, is from about 40° C. to about 250° C. The temperature range for mixing the base resin and initiator in the upstream barrel zones is from about the melting temperature of the base resin to below the cross-linking onset temperature, and preferably within about 40° C. of the melting temperature of the base resin. For example, for an unsaturated polyester base resin the temperature is preferably about 90° C. to about 130° C. The temperature range for the cross-linking reaction in the downstream barrel zones is above the cross-linking onset temperature and the base resin melting temperature, preferably within about 150° C. of the base resin melting temperature. For example, for an unsaturated polyester base resin, the temperature is preferably about 90° C. to about 250° C. The die or head pressure generator 13 generates pressure from about 50 pounds per square inch to about 500 pounds per square inch. In one embodiment, the screw is allowed to rotate at about 100 revolutions per minute, the temperature along barrel 5 is maintained at about 70° C. in the first barrel section and 160° C. further downstream, and the die pressure is about 50 pounds per square inch.

When cross-linking in a batch internal melt mixing device, the residence time is preferably in the range of about 10 seconds to about 5 minutes. The rotational speed of a rotor in the device is preferably about 10 to about 500 revolutions per minute.

Thus, in a process of this invention, a reactive base resin and a chemical initiator are fed to a reactive melt mixing apparatus and cross-linking is carried out at high temperature and high shear to produce a cross-linked resin which enables the preparation of low fix temperature toners with good fusing latitude and vinyl offset properties.

The base resin used in the process of this invention is a reactive polymer, preferably a linear reactive polymer such as, for example, linear unsaturated polyester. In preferred embodiments, the base resin has a degree of unsaturation of about 0.1 to about 30 mole percent, preferably about 5 to about 25 mole percent. In a preferred embodiment, the linear unsaturated polyester base resin is characterized by number-average molecular weight ($M_n$) as measured by gel permeation chromatography (GPC) in the range typically from 1000 to about 20,000, and preferably from about 2000 to about 5000, weight-average molecular weight ($M_w$) in the range typically from 2000 to about 40,000, and preferably from about 4000 to about 15,000. The molecular weight distribution ($M_w/M_n$) is in the range typically from about 1.5 to about 6, and preferably from about 2 to about 4. Onset glass transition temperature ($T_g$) as measured by differential scanning calorimetry (DSC) is in the range typically from 50° C. to about 70° C., and preferably from about 51° C. to about 60° C. Melt viscosity as measured with a mechanical spectrometer at 10 radians per second is from about 5,000 to about 200,000 poise, and preferably from about 20,000 to about 100,000 poise, at 100° C. and drops sharply with increasing temperature to from about 100 to about 5000 poise, and preferably from about 400 to about 2,000 poise, as temperature rises from 100° C. to 130° C.

Linear unsaturated polyesters used as the base resin are low molecular weight condensation polymers which may be formed by the step-wise reactions between both saturated and unsaturated diacids (or anhydrides) and dihydric alcohols (glycols or diols). The resulting unsaturated polyesters are reactive (e.g., cross-linkable) on two fronts: (i) unsaturation sites (double bonds) along the polyester chain, and (ii) functional groups such as carboxyl, hydroxy, etc. groups amenable to acid-base reactions. Typical unsaturated polyesters useful for this invention are prepared by melt polycondensation or other polymerization processes using diacids and/or anhydrides and diols. Suitable diacids and anhydrides include but are not limited to saturated diacids and/or anhydrides such as, for example, succinic acid, glutaric acid, adipic acid, pimelic acid, suberic acid, azelaic acid, sebacic acid, isophthalic acid, terephthalic acid, hexachloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as, for example, maleic acid, fumaric acid, chloromaleic acid, methacrylic acid, acrylic acid, itaconic acid, citraconic acid, mesaconic acid, maleic anhydride, and the like and mixtures thereof. Suitable diols include but are not limited to, for example propylene glycol, ethylene glycol, diethylene glycol, neopentyl glycol, dipropylene glycol, dibromoneopentyl glycol, propoxylated bisphenol A, 2,2,4-trimethylpentane-1,3-diol, tetrabromo bisphenol dipropoxy ether, 1,4-butanediol, and the like and mixtures thereof, soluble in good solvents such as, for example, tetrahydrofuran, toluene and the like.

Preferred linear unsaturated polyester base resins are prepared from diacids and/or anhydrides such as, for example maleic anhydride, fumaric acid, and the like and mixtures thereof, and diols such as, for example, propoxylated bisphenol A, propylene glycol, and the like and mixtures thereof. A particularly preferred polyester is poly(propoxylated bisphenol A fumarate).

Substantially any suitable unsaturated polyester can be used in the process of the invention, including unsaturated polyesters known for use in toner resins and including unsaturated polyesters whose properties previously made them undesirable or unsuitable for use as toner resins (but which adverse properties are eliminated or reduced by cross-linking them by the process of the present invention).

Any appropriate initiation technique for cross-linking can be used in the process of the invention. Chemical initiators such as, for example, organic peroxides or azo-compounds are preferred for this process. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di (2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di (t-butyl peroxy) hexane, t-butyl cumyl peroxide, α-α-bis (t-butyl peroxy) diisopropyl benzene, di-t-butyl peroxide and 2,5-dimethyl 2,5-di (t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di (t-butyl peroxy) valerate, 1,1-di (t-butyl peroxy) 3,3,5-trimethyl cyclohexane, 1,1-di (t-butyl peroxy) cyclohexane, 1,1-di (t-amyl peroxy) cyclohexane, 2,2-di (t-butyl peroxy) butane, ethyl 3,3-di (t-butyl peroxy) butyrate and ethyl 3,3-di (t-amyl peroxy) butyrate. Suitable azo-compounds include azobis-isobutyronitrile, 2,2'-azobis (isobutyronitrile), 2,2'-azobis (2,4-dimethyl valeronitrile), 2,2'-azobis (methyl butyronitrile), 1,1'-azobis (cyano cyclohexane) and other similar known compounds.

In the cross-linking reaction which occurs in the process of the present invention at high temperature and high shear, the chemical initiator, such as for example benzoyl peroxide, disassociates to form free radicals which attack the linear unsaturated base resin polymer chains (e.g., at double bonds) to form polymeric radicals. Cross-linking occurs as these polymeric radicals react with other unsaturated chains or other polymeric radicals many times, forming very high molecular weight densely cross-linked gel particles with high cross-linking density.

The cross-linking which occurs in the process of the invention is characterized by at least one reactive site (e.g., one unsaturation) within a polymer chain reacting substantially directly (e.g., with no intervening monomer(s)) with at least one reactive site within a second polymer chain, and by this reaction occurring repeatedly to form a series of cross-linked units. This polymer cross-linking reaction may occur by a number of mechanisms. Without intending to be bound by theory, it is believed that the cross-linking may occur through one or more of the following mechanisms:

For example, when an exemplary propoxylated bisphenol A fumarate unsaturated polymer undergoes a cross-linking reaction with a chemical cross-linking initiator, such as, for example, benzoyl peroxide, free radicals produced by the chemical initiator may attack an unsaturation site on the polymer in the following manner:

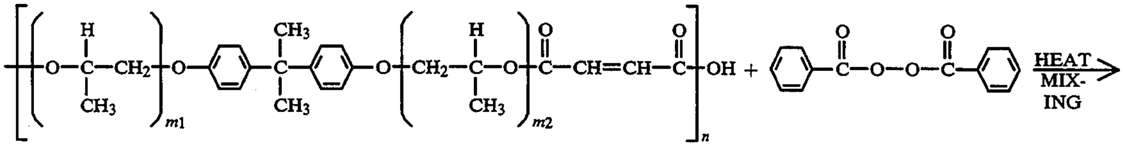

-continued

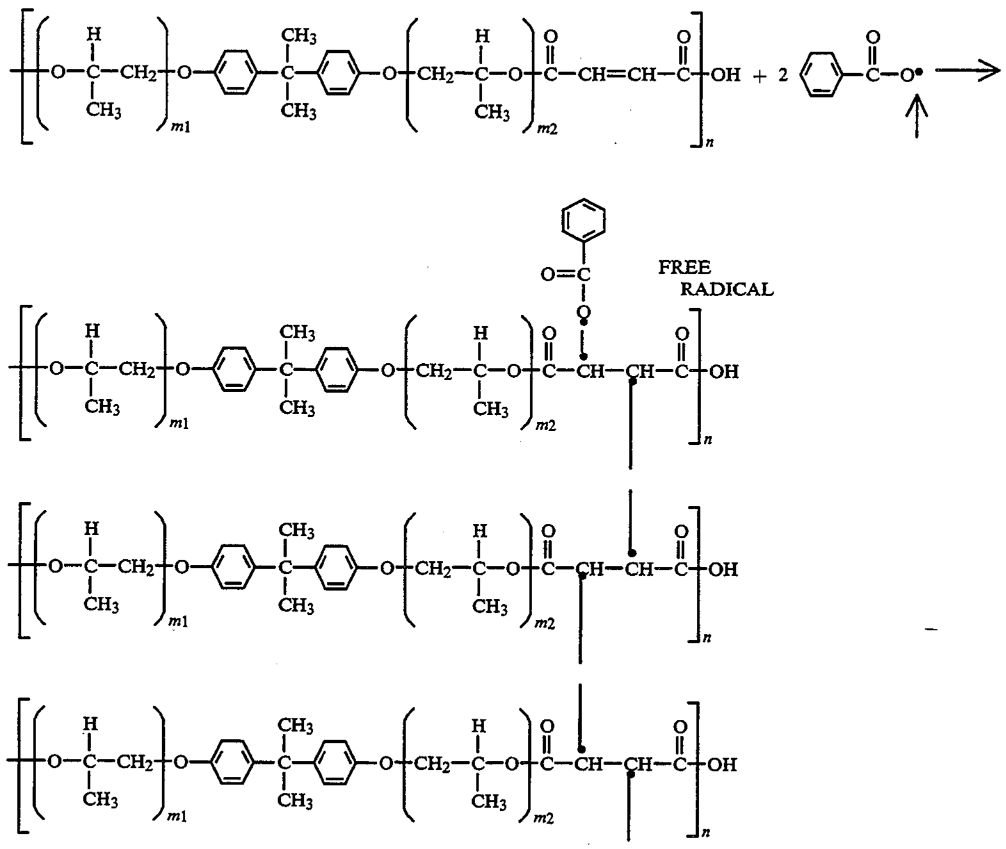

This manner of cross-linking between chains will produce a large, high molecular weight molecule, ultimately forming a gel. (In preferred embodiments of this exemplary polyester, $m_1$ and $m_2$ are at least 1 and the sum of $m_1$ and $m_2$ is not greater than 3, or $m_1$ and $m_2$ are independently 1-3, and n is approximately 8 to 11.)

By a second mechanism, cross-linking may occur between chains of the same exemplary molecule where the free radicals formed from a chemical cross-linking initiator such as benzoic acid attack the carbon of the propoxy group by hydrogen abstraction of a tertiary hydrogen of a benzoyloxy radical in the following manner:

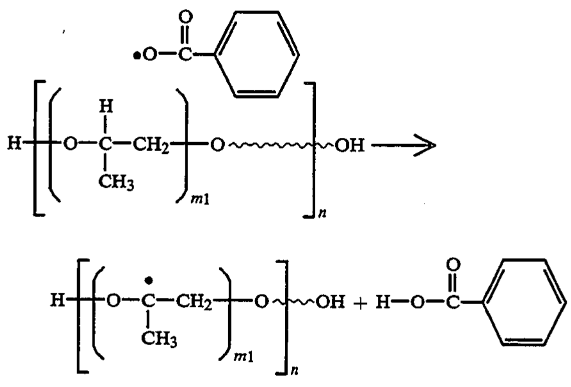

A small concentration of initiator is adequate to carry out the cross-linking, usually in the range from about 0.01 to about 10 percent by weight of initiator in the base resin, and preferably in the range from about 0.1 to about 4 percent by weight of initiator in the base resin. By carrying out the cross-linking in the melt state at high temperature and high shear in a melt mixing device such as an extruder, the gel particles formed during cross-linking are kept small (i.e. less than about 0.1 micron, and preferably about 0.005 to about 0.1 micron, in average volume particle diameter as determined by scanning electron microscopy and transmission electron microscopy) and their size does not grow with increasing degree of cross-linking. Also, the high shear enables the microgel particles to be substantially uniformly dispersed in the polymer melt.

An advantage of using a chemical initiator as the cross-linking agent is that by utilizing low concentrations of initiator (for example, less than 10 percent by weight and often less than 4 percent by weight) and carrying out the cross-linking at high temperature, little or no unreacted initiator remains in the product, and therefore, the residual contaminants produced in the cross-linking reaction are minimal.

Thus, the cross-linked resin produced in the process of this invention is a clean and safe polymer mixture comprising cross-linked gel particles and a noncross-linked or linear portion but substantially no sol. The gel content of the cross-linked resin ranges from about 0.001 to about 50 percent by weight, and preferably from about 0.1 to about 40 or 10 to 19 percent by weight, wherein the gel content is defined as follows:

$$\text{Gel Content} = \frac{\text{Total Sample Weight} - \text{Weight of Soluble Polymer}}{\text{Total Sample Weight}} \times 100\%$$

There is substantially no cross-linked polymer which is not gel, that is, low cross-link density polymer or sol, as would be obtained in conventional cross-linking processes such as, for example, polycondensation, bulk, solution, suspension, emulsion and suspension polymerization processes.

The cross-linked portions of the cross-linked resin consist essentially of very high molecular weight densely cross-linked microgel particles and which are not soluble in substantially any solvents such as, for example, tetrahydrofuran, toluene and the like. The microgel particles are highly cross-linked polymers with a short cross-link distance of zero or a maximum of one atom such as, for example, oxygen.

The linear portions of the cross-linked resin have substantially the same number average molecular weight ($M_n$), weight-average molecular weight ($M_w$), molecular weight distribution ($M_w/M_n$), onset glass transition temperature ($T_g$) and melt viscosity as the base resin. Thus embodiments of the entire cross-linked resin have an onset glass transition temperature of from about 50° C. to about 70° C., and preferably from about 51° C. to about 60° C., and a melt viscosity of from about 5,000 to about 200,000 poise, and preferably from about 20,000 to about 100,000 poise, at 100° C. and from about 10 to about 20,000 poise at 160° C.

In the preferred embodiment of a cross-linked unsaturated polyester resin prepared by the process of this invention, the cross-linked resin enables the preparation of toners with minimum fix temperatures in the range of about 100° C. to about 200° C., preferably about 100° C. to about 160° C., more preferably about 100° to about 140° C. Also, these low fix temperature toners have fusing latitudes ranging from about 10° C. to about 120° C. and preferably more than about 20° C. and more preferably more than about 30° C. The process of the invention can produce toner resins and thus toners with minimized or substantially no vinyl offset.

Figure 2:
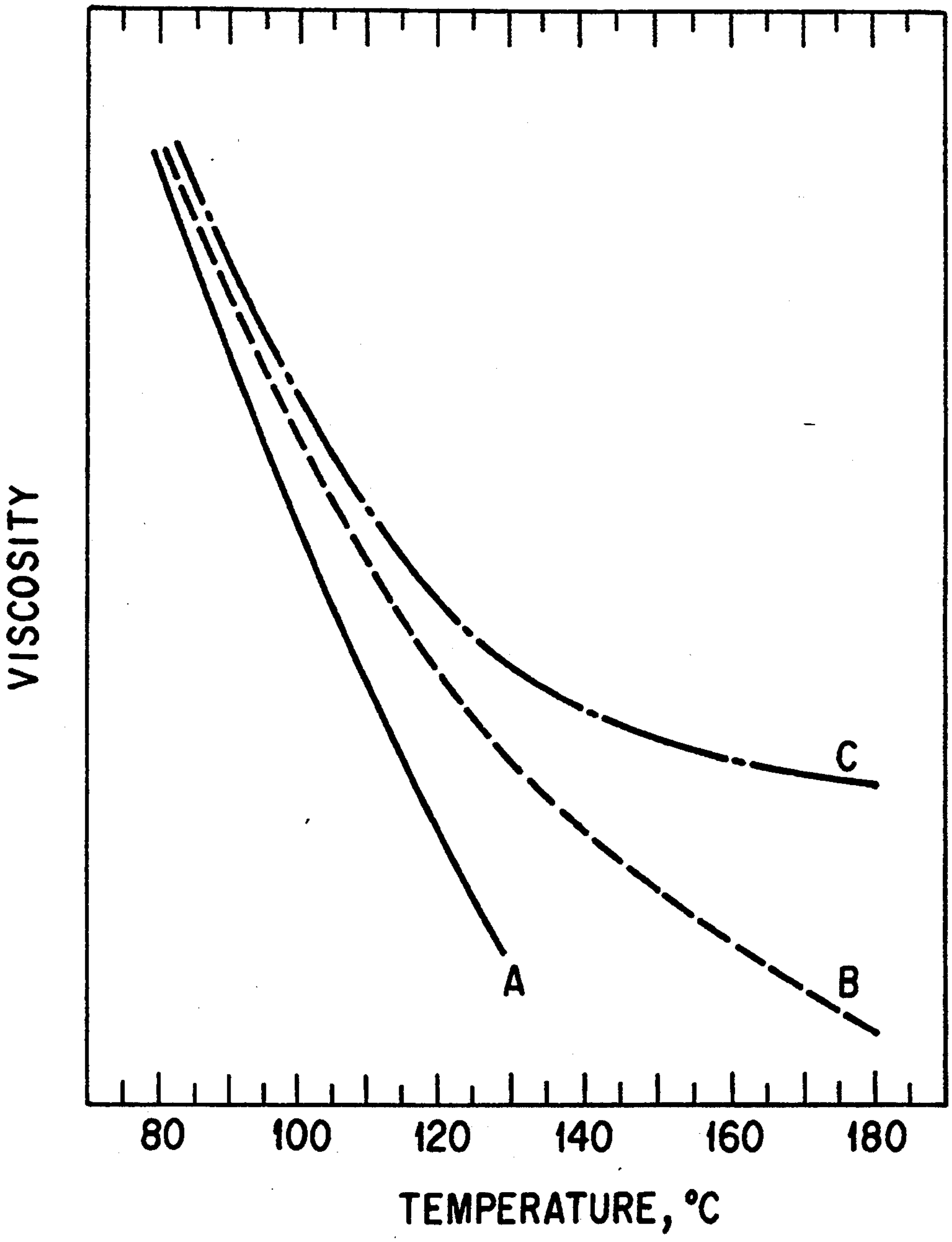
FIG. 2 depicts the effect of temperature on melt viscosity of various toner resins. Viscosity curve A is for a base resin which is a linear (noncross-linked) unsaturated polyester resin with low fix temperature and very low fusing latitude (thus, not suitable for hot roll fusing). Viscosity curves B and C are for cross-linked polyester resins prepared by a process of the present invention with low fix temperature and good fusing latitude. The resin of curve C has a higher gel content than that of curve B.
Figure 3:
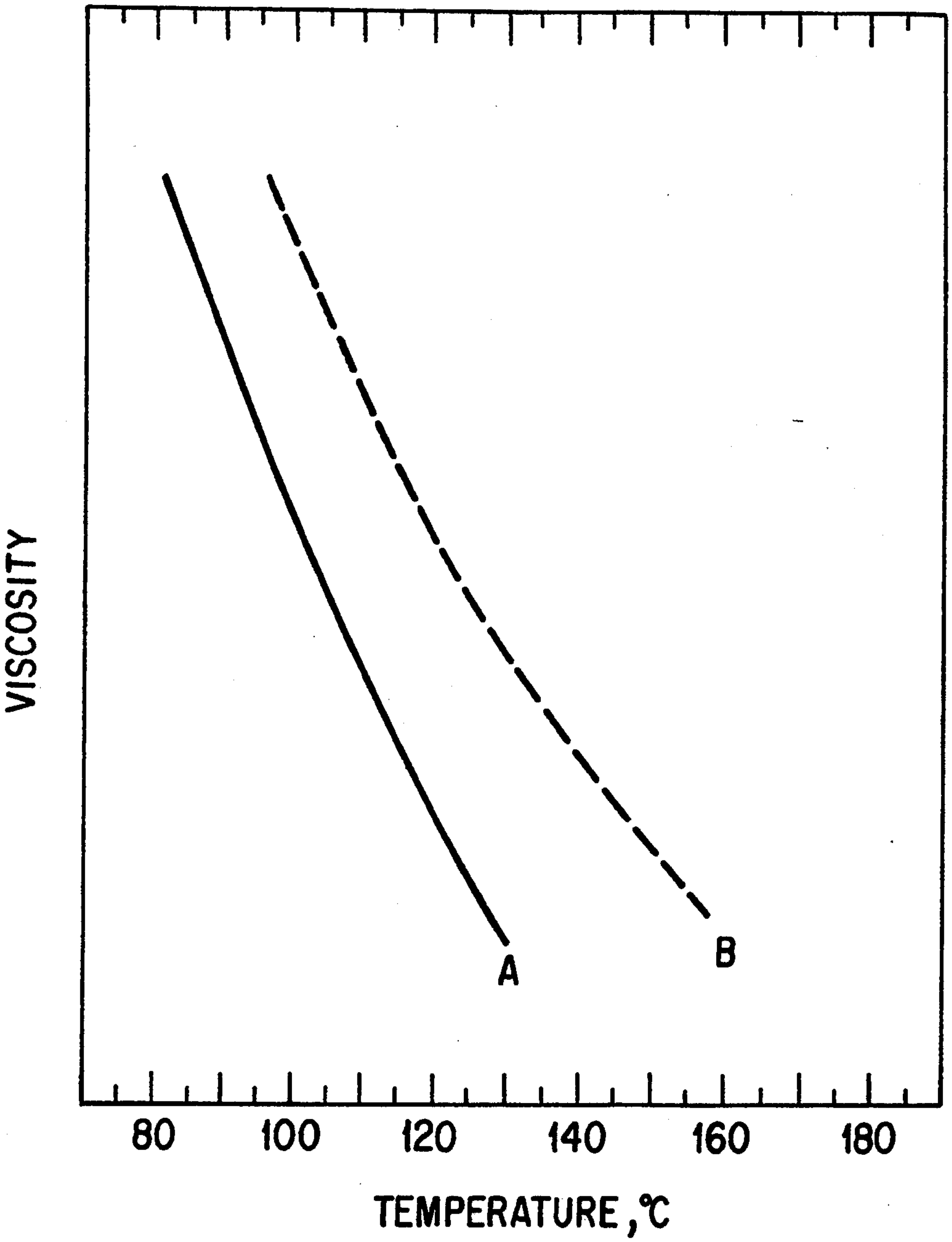
FIG. 3 depicts the effect of cross-linking on the melt viscosity of resins prepared by the conventional cross-linking approach. Viscosity curve A is for a linear (noncross-linked) unsaturated polyester resin with low fix temperature and very low fusing latitude. Viscosity curve B is for an unsaturated polyester resin cross-linked by conventional methods which has a good fusing latitude, but also a high fixing temperature.

Cross-linked polymers so produced have the important rheological property of allowing a toner prepared therefrom to show low fix temperature and high offset temperature. The low fix temperature is a function of the molecular weight and molecular weight distribution of the linear portion, and is believed not to be significantly affected by the amount of microgel or degree of cross-linking in the resin. This is portrayed by the proximity of the viscosity curves at low temperature such as for example at 100° C. as shown in FIG. 2 for cross-linked unsaturated polyester. The hot offset temperature is increased with the presence of microgel particles which impart elasticity to the resin. With higher degree of cross-linking or gel content, the hot offset temperature increases. This is reflected in divergence of the viscosity curves at high temperature such as, for example, at 160° C. as also shown in FIG. 2. As the degree of cross-linking or gel content increases, the low temperature melt viscosity does not change significantly while the high temperature melt viscosity goes up. In an exemplary embodiment, the hot offset temperature can increase approximately 30%. Again, this can be achieved by cross-linking in the melt state at high temperature and high shear such as, for example, in an extruder resulting in the formation of microgel alone, distributed substantially uniformly throughout the linear portion, and substantially no intermediates which are cross-linked polymers with low cross-linking density (sol). When cross-linked intermediate polymers are generated by conventional polymerization processes, the viscosity curves shift in parallel from low to high degree of cross-linking as shown in FIG. 3. This is reflected in increased hot offset temperature, but also increased minimum fix temperature.

In addition to rendering a unique rheological property to the toner resin not attainable to date in conventional cross-linking processes for preparing toner resins, the reactive melt mixing process has several other important advantages in the context of the present invention. By choosing the type and molecular weight properties of the base resin, the minimum fix temperature can be easily manipulated. The hot offset temperature can be easily manipulated by the gel content in the cross-linked resin which can be controlled by the amount of initiator fed to the extruder and/or regulating the extruder process conditions such as, for example, feed rate, screw rotational speed, barrel temperature profile and screw configuration and length. Thus, it is possible to produce a series of resins and thus toners with the same MFT, but with different fusing latitudes. Cross-linking by the use of chemical initiators in the extruder is one of the cleanest means of modifying resin, since very low concentrations of initiators are used, often less than 4 percent by weight, and the residual contaminants of the cross-linking reaction are minimal.

The resins are generally present in the toner in an amount of from about 40 to about 98 percent by weight, and more preferably from about 70 to about 98 percent by weight, although they may be present in greater or lesser amounts, provided that the objectives of the invention are achieved. For example, toner resin produced by the process of the invention can be subsequently melt blended or otherwise mixed with a colorant, charge carrier additives, surfactants, emulsifiers, pigment dispersants, flow additives, and the like. The resultant product can then be pulverized by known methods such as milling to form toner particles. The toner particles preferably have an average volume particle diameter of about 5 to about 25, more preferably about 10 to about 20 microns.

Various suitable colorants can be employed in toners of the invention, including suitable colored pigments, dyes, and mixtures thereof including Carbon Black, such as Regal 330® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast blue, Cinquassi Green, Hostaperm Green, titanium dioxide, cobalt, nickel, iron powder, Sicopur 4068 FF, and iron oxides such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitable effective positive or negative charge enhancing additives can be selected for incorporation into the toner compositions produced by the present invention, preferably in an amount of about 0.1 to about 10, more preferably about 1 to about 3, percent by weight. Examples include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as Bontron E84™ or E88™ (Hodogaya Chemical); and the like.

Additionally, other internal and/or external additives may be added in known amounts for their known functions.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is hereby totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are hereby totally incorporated hereby by reference.

The selected carrier particles can be used with or without a coating, the coating generally being comprised of fluoropolymers, such as polyvinylidene fluoride resins, terpolymers of styrene, methyl methacrylate, a silane, such as triethoxy silane, tetrafluoroethylenes, other known coatings and the like.

The diameter of the carrier particles is generally from about 50 microns to about 1,000 microns, preferably about 200 microns, thus allowing these particles to possess sufficient density and inertia to avoid adherence to the electrostatic images during the development process. The carrier particles can be mixed with the toner particles in various suitable combinations. Best results are obtained when about 1 part carrier to about 10 parts to about 200 parts by weight of toner are mixed.

Toners produced by the process of the invention can be used in known electrostatographic imaging methods, although the fusing energy requirements of some of those methods can be reduced in view of the advantageous fusing properties of the subject toners as discussed herein. Thus, for example the toners or developers can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 160° C., more preferably lower than 140° C., and more preferably about 110° C.

The invention will further be illustrated in the following, nonlimiting examples, it being understood that these examples are intended to be illustrative only and that the invention is not intended to be limited to the materials, conditions, process parameters and the like recited herein. Parts and percentages are by weight unless otherwise indicated.

EXAMPLE I

A cross-linked unsaturated polyester resin is prepared by the reactive extrusion process by melt mixing 99.3 parts of a linear unsaturated polyester with the following structure:

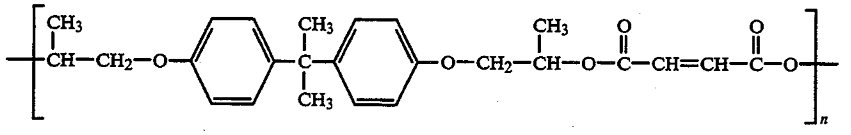

wherein n is the number of repeating units and having $M_n$ of about 4,000, $M_w$ of about 10,300, $M_w/M_n$ of about 2.58 as measured by GPC, onset $T_g$ of about 55° C. as measured by DSC, and melt viscosity of about 29,000 poise at 100° C. and about 750 poise at 130° C. as measured at 10 radians per second, and 0.7 parts benzoyl peroxide initiator as outlined in the following procedure.

The unsaturated polyester resin and benzoyl peroxide initiator are blended in a rotary tumble blender for 30 minutes. The resulting dry mixture is then fed into a Werner & Pfleiderer ZSK-30 twin screw extruder, with a screw diameter of 30.7 mm and a length-to-diameter (L/D) ratio of 37.2, at 10 pounds per hour using a loss-in-weight feeder. The cross-linking is carried out in the extruder using the following process conditions: barrel temperature profile of 70/140/140/140/140/140/140° C., die head temperature of 140° C., screw speed of 100 revolutions per minute and average residence time of about three minutes. The extrudate melt, upon exiting from the strand die, is cooled in a water bath and pelletized. The product which is cross-linked polyester has an onset $T_g$ of about 54° C. as measured by DSC, melt viscosity of about 40,000 poise at 100° C. and about 150 poise at 160° C. as measured at 10 radians per second, a gel content of about 0.7 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 3,900, $M_w$ of about 10,100, $M_w/M_n$ of about 2.59, and onset $T_g$ of 55° C. which is substantially the same as the original noncross-linked resin, which indicates that it contains no sol.

Thereafter, a toner is formulated by melt mixing the above prepared cross-linked unsaturated polyester resin, 92 percent by weight, with 6 percent by weight carbon black and 2 percent by weight alkyl pyridinium halide charge enhancing additive in a Haake batch mixer. The toner is pulverized and classified to form a toner with an average particle diameter of about 9.1 microns and a geometric size distribution (GSD) of about 1.32. The toner is evaluated for fixing, blocking, and vinyl offset performance. Results show that the cold offset temperature is about 110° C., the minimum fix temperature is about 126° C., the hot offset temperature is about 135° C., and the fusing latitude is about 9° C. Also, the toner has excellent blocking performance (about 53° C. as measured by DSC) and shows no apparent vinyl offset.

EXAMPLE II

A cross-linked unsaturated polyester resin is prepared by the reactive extrusion process by melt mixing 98.6 parts of a linear unsaturated polyester with the structure and properties described in Example I, and 1.4 parts benzoyl peroxide initiator as outlined in the following procedure.

The unsaturated polyester resin and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The cross-linking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized. The product which is cross-linked polyester has an onset $T_g$ of about 54° C. as measured by DSC, melt viscosity of about 65,000 poise at 100° C. and about 12,000 poise at 160° C. as measured at 10 radians per second, a gel content of about 50 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 3,900, $M_w$ of about 10,100, $M_w/M_n$ of about 2.59, and onset $T_g$ of 55° C. which is substantially the same as the original noncross-linked resin, which indicates that it contains no sol.

Thereafter, a toner is prepared and evaluated according to the same procedure as in Example I except that the average particle diameter is about 9.8 microns and the GSD is about 1.33. Results show that the cold offset temperature is about 110° C., the minimum fix temperature is about 135° C., the hot offset temperature is about 195° C., and the fusing latitude is about 60° C. Also, the toner has excellent blocking performance (about 53° C. as measured by DSC) and shows no apparent vinyl offset.

COMPARATIVE EXAMPLE I

This comparative example shows the effect of changes in gel content on toner fixing performance for cross-linked unsaturated polyester resins. Two resins are compared in this example. Resin A is linear unsaturated polyester with the structure and properties of the linear unsaturated polyester described in Example I. Resin B is partially cross-linked polyester resin prepared by the reactive extrusion process by melt mixing 99.0 parts linear unsaturated polyester (Resin A) and 1.0 part benzoyl peroxide initiator as outlined in the following procedure.

The unsaturated polyester resin (Resin A) and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The cross-linking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized.

Thereafter, Toners A and B are prepared from the resins A and B, and evaluated according to the same procedure as in Example I. The toner of resin A has an average particle diameter of about 9.3 microns and a GSD of about 1.29. The toner of resin B has an average particle diameter of about 10.1 microns and a GSD of about 1.32. Results of fixing tests are shown in Table 1. Results for Toner A produced from Resin A show a cold offset temperature of about 110° C. and a hot offset temperature of about 120° C. Due to the proximity of COT and HOT, it is not possible to determine the minimum fix temperature, indicating that the fusing latitude is very small. From Table 1, it can be seen that with a toner resin of the invention, the fusing latitude is dramatically higher, while the minimum fix temperature remains virtually unchanged.

TABLE 1

| | Linear Content Wt % | Sol Content Wt % | Gel Content Wt % | COT °C. | MFT °C. | HOT °C. | FL °C. |
|---|---|---|---|---|---|---|---|
| Toner A | 100 | 0 | 0 | 110 | — | 120 | — |
| Toner B | 85 | 0 | 15 | 110 | 129 | 155 | 26 |

COMPARATIVE EXAMPLE II

This comparative example shows the difference between cross-linked polyester resins prepared by a conventional cross-linking method versus the resin prepared according to the present invention. Two additional resins are considered in this example, a linear polyester and a cross-linked polyester prepared by conventional cross-linking.

First, a linear polyester resin, Resin C, is prepared by the following procedure. About 1,645 grams of dimethyl terephthalate, 483 grams of 1,2-propane diol, and 572 grams of 1,3-butane diol are charged to a three liter, four necked resin kettle which is fitted with a thermometer, a stainless steel stirrer, a glass inlet tube and a flux condenser. The flask is supported in an electric heating mantle. Argon gas is allowed to flow through the glass inlet tube thereby sparging the reaction mixture and providing an inert atmosphere in the reaction vessel. The stirrer and heating mantle are activated and the reaction mixture is heated to about 80° C. at which time about 0.96 grams of tetraisopropyl titanate is added to the reaction mixture. The reaction mixture is gradually heated to a temperature of about 170° C. whereupon methanol from the condensation reaction is condensed and is removed as it is formed. As the reaction progresses and more methanol is removed, the reaction temperature is slowly increased to about 200° C. Over this period, about 94 weight percent of the theoretical methanol is removed. At this time, the reactor is cooled to room temperature and the reactor is modified by replacing the reflux condenser with a dry ice-acetone cooled trap with the outlet of the trap connected to a laboratory vacuum pump through an appropriate vacuum system. Heat is reapplied to the reactor with the reactants under argon purge. As the reactants become molten, stirring is started. When the reactants are heated to about 84° C. the vacuum is about 30 microns mercury. The reaction is continued at about these conditions for about seven hours until the reactants become so viscous that considerable difficulty is encountered in removing the volatile reaction by-products from the reactants. At this point, the vacuum is terminated by an argon purge and the reaction product is cooled to room temperature. The resulting polymer is found to have a hydroxyl number of about 48, an acid number of about 0.7, a methyl ester number of about 7.5 and a glass transition temperature of about 56° C. Using vapor pressure osmometry in methyl ethyl ketone, the number average molecular weight of the resulting linear polymer is found to be about 4,100.

Second, a cross-linked polyester resin, Resin D, is prepared by polyesterification by the following procedure. About 1,645 grams of dimethyl terephthalate, 483 grams of 1,2-propane diol, 572 grams of 1,3-butane diol and 15 grams of pentaerythritol as cross-linking agent are charged to a three liter, four necked resin kettle and the polyesterification and cross-linking are carried out under the same conditions as above. The resulting polymer is found to have a hydroxyl number of about 48, an acid number of about 0.7, a methyl ester number of about 7.5 and a glass transition temperature of about 56° C. By dissolution in chloroform and filtration through a 0.22 micron MF millipore filter under air pressure, the polymer is found to contain about 16 weight percent gel. Using vapor pressure osmometry in methyl ethyl ketone, the number average molecular weight of the soluble fraction of the polymer is found to be about 6,100 which is comprised of linear polymer with a number average molecular weight of about 4,200 and sol.

Thereafter, Toners C and D are prepared from the two resins, C and D, and evaluated according to the same procedure as in Example I. Results of fixing tests are shown in Table 2 along with the results for a toner of Resin B (of the present invention). The toner particles of Resin C have an average particle diameter of about 8.7 microns and a GSD of about 1.30, while those of Resin D have an average particle diameter of about 10.5 microns and a GSD of about 1.31. The hot offset temperature increases (32° C.) with increasing degree of cross-linking (sol and gel content is 30%). However, this is also accompanied by an increase in minimum fix temperature resulting in only a small increase in fusing latitude (10° C.). Most of the benefit achieved by cross-linking is lost due to the increase in minimum fix temperature. Also in Table 2 are the results of fusing evaluations for Toner B, a cross-linked unsaturated polyester resin of the present invention (see Comparative Example I for details). With Toner B, the fusing latitude increases dramatically with increasing gel content and without increasing sol content, while the minimum fix temperature remains virtually unchanged.

TABLE 2

| | Linear Content Wt. % | Sol Content Wt. % | Gel Content Wt % | COT °C. | MFT °C. | HOT °C. | FL °C. |
|---|---|---|---|---|---|---|---|
| Toner C | 100 | 0 | 0 | 110 | — | 120 | — |
| Toner D | 70 | 14 | 16 | 120 | 146 | 156 | 10 |
| Toner B | 85 | 0 | 15 | 110 | 129 | 155 | 26 |

EXAMPLE III

A cross-linked unsaturated polyester resin is prepared by the reactive extrusion process by melt mixing 98.8 parts of a linear unsaturated polyester with the structure described in Example I and having $M_n$ of about 3,600, $M_w$ of about 11,000, $M_w/M_n$ of about 3.06 as measured by GPC, onset $T_g$ of about 55° C. as measured by DSC, and melt viscosity of about 30,600 poise at 100° C. and about 800 poise at 130° C. as measured at 10 radians per second, and 1.2 parts benzoyl peroxide initiator as outlined in the following procedure.

A 50 gram blend of the unsaturated polyester resin and benzoyl peroxide initiator is prepared by blending in a rotary tumble blender for 20 minutes. The resulting dry mixture is then charged into a Haake batch mixer, and the cross-linking is carried out in the mixer using the following process conditions: barrel temperature of 160° C., rotor speed of 100 revolutions per minute, and mixing time of 15 minutes. The product which is cross-linked polyester has an onset $T_g$ of about about 54° C. as measured by DSC, melt viscosity of about 42,000 poise at 100° C. and about 1,200 poise at 160° C. as measured at 10 radians per second, a gel content of about 11 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC and DSC, is found to have $M_n$ of about 3,500, $M_w$ of about 10,700, $M_w/M_n$ of about 3.06, and onset $T_g$ of 55° C., which is substantially the same as the original noncross-linked resin, which indicates that it contains substantially no sol.

Thereafter, a toner is prepared and evaluated according to the same procedure as in Example I except that the average particle diameter is about 9.9 microns and the GSD is about 1.31. Results show that the cold offset temperature is about 110° C., the minimum fix temperature is about 127° C., the hot offset temperature is about 150° C., and the fusing latitude is about 23° C. Also, the toner has excellent blocking performance (about 53° C. as measured by DSC) and shows no apparent vinyl offset.

EXAMPLE IV

A cross-linked unsaturated polyester resin is prepared by the reactive extrusion process by melt mixing 98.7 parts of a linear unsaturated polyester with the structure and properties described in Example III and 1.3 parts t-amyl peroxy 2-ethyl hexanoate initiator as outlined in the following procedure.

49.35 grams unsaturated polyester resin and 0.65 grams t-amyl peroxy 2-ethyl hexanoate liquid initiator are separately charged into a Haake batch mixer, and the cross-linking is carried out in the mixer using the following process conditions: barrel temperature of 140° C., rotor speed of 100 revolutions per minute, and mixing time of 15 minutes. The resulting product which is cross-linked polyester has an onset $T_g$ of about about 54° C. as measured by DSC, melt viscosity of about 51,000 poise at 100° C. and about 3,100 poise at 160° C. as measured at 10 radians per second, a gel content of about 17 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC and DSC, is found to have $M_n$ of about 3,500, $M_w$ of about 10,600, $M_w/M_n$ of about 3.03, and onset $T_g$ of 55° C. which is substantially the same as the original noncross-linked resin, which indicates that it contains substantially no sol.

Thereafter, a toner is prepared and evaluated according to the same procedure as in Example I except that the average particle diameter is about 10.4 microns and the GSD is about 1.32. Results show that the cold offset temperature is about 110° C., the minimum fix temperature is about 130° C., the hot offset temperature is about 160° C., and the fusing latitude is about 30° C. Also, the toner has excellent blocking performance (about 53° C. as measured by DSC) and shows no apparent vinyl offset.

EXAMPLE V

A cross-linked unsaturated polyester resin is prepared by the reactive extrusion process by melt mixing 98.9 parts by weight of a linear unsaturated polyester with the structure and properties described in Example I, and 1.1 parts by weight benzoyl peroxide initiator as outlined in the following procedure.

The unsaturated polyester resin and benzoyl peroxide initiator are blended in a rotary tumble blender for 30 minutes. The resulting dry mixture is then fed into a Werner & Pfieiderer ZSK-30 twin screw extruder at 10 pounds per hour using a loss-in-weight feeder. The cross-linking is carried out in the extruder using the following process conditions: barrel temperature profile of 70/140/140/140/140/140/140° C., die head temperature of 140° C., screw rotational speed of 100 revolutions per minute and average residence time of about three minutes. The extrudate melt, upon exiting from the strand die, is cooled in a water bath and pelletized. The resulting product which is cross-linked polyester has an onset $T_g$ of about 54° C. as measured by DSC, melt viscosity of about 45,000 poise at 100° C. and about 1,600 poise at 160° C. as measured at 10 radians per second, a gel content of about 13 weight percent and a mean microgel particle size of about 0.1 microns as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC and DSC, is found to have $M_n$ of about 3,900, $M_w$ of about 10,100, $M_w/M_n$ of about 2.59, and onset $T_g$ of 55° C., which is substantially the same as the original noncross-linked resin, which indicates that it contains substantially no sol.

Thereafter, a toner is prepared and evaluated according to the same procedure as in Example I, except that the average particle diameter is about 9.6 microns and the GSD is about 1.30. Results show that the cold offset temperature is about 100° C., the minimum fix temperature is about 128° C., the hot offset temperature is about 155° C., and the fusing latitude is about 27° C. Also, the toner has excellent blocking performance (about 53° C. as measured by DSC) and shows no apparent vinyl offset.

While this invention has been described with reference to particular preferred embodiments, the invention is not limited to the specific examples given, and other embodiments and modifications can be made by those skilled in the art without departing from the spirit and scope of the invention.

What is claimed is:

1. A reactive melt mixing process of preparing low fix temperature toner resin substantially free of sol, comprising the steps of:

(a) melting a reactive base resin, thereby forming a polymer melt; and (b) cross-linking said polymer melt under high shear to form a cross-linked toner resin substantially free of sol.

2. The process of claim 1, wherein said process is a batch melt mixing process.

3. The process of claim 1, wherein said process is a continuous melt mixing process.

4. The process of claim 1, wherein a free radical-forming chemical initiator is used as a cross-linking agent.

5. The process of claim 1, further comprising the step of mixing said reactive base resin and a chemical initiator prior to forming said polymer melt.

6. The process of claim 1, further comprising the step of mixing a chemical initiator into said polymer melt at a temperature lower than the onset of cross-linking temperature, thereby substantially uniformly dispersing the chemical initiator in said polymer melt prior to onset of cross-linking of said polymer melt.

7. The process of claim 6, further comprising the step of initiating cross-linking of said polymer melt with said chemical initiator by raising the temperature of said polymer melt above the onset of cross-linking temperature and controlling the temperature of said polymer melt during said cross-linking.

8. The process of claim 6, further comprising the step of initiating cross-linking of said polymer melt with said chemical initiator by raising the temperature of said polymer melt above the onset of cross-linking temperature and within 150° C. of the base resin melting temperature, and controlling the temperature of said polymer melt during said cross-linking.

9. The process of claim 1, comprising allowing said cross-linking reaction to be carried to completion.

10. The process of claim 1, wherein said reactive base resin is a linear unsaturated resin.

11. The process of claim 1, wherein said reactive base resin consists essentially of linear unsaturated polyester resin.

12. The process of claim 11, wherein said linear unsaturated polyester resin has a number-average molecular weight ($M_n$) as measured by gel permeation chromatography (GPC) in the range from 1000 to about 20,000, weight-average molecular weight ($M_w$) in the range from 2000 to about 40,000, molecular weight distribution ($M_w/M_n$) in the range from about 1.5 to about 6, onset glass transition temperature ($T_g$) as measured by differential scanning calorimetry in the range from 50° C. to about 70° C., and melt viscosity as measured with a mechanical spectrometer at 10 radians per second from about 5,000 to about 200,000 poise at 100° C., said melt viscosity dropping with increasing temperature to from about 100 to about 5000 poise at 130° C.

13. The process of claim 11, wherein said linear unsaturated polyester base resin is prepared from (a) at least one diacid or anhydride selected from the group consisting of maleic acid, fumaric acid, chloromaleic acid, methacrylic acid, acrylic acid, itaconic acid, citraconic acid, mesaconic acid, maleic anhydride, and mixtures thereof, and (b) at least one diol selected from the group consisting of propylene glycol, ethylene glycol, diethylene glycol, neopentyl glycol, dipropylene glycol, dibromoneopentyl glycol, propoxylated bisphenol A, 2,2,4-trimethylpentane-1,3-diol tetrabromobisphenol dipropoxy ether, 1,4-butanediol, and mixtures thereof.

14. The process of claim 11, wherein said linear unsaturated polyester resin is poly(propoxylated bisphenol A fumarate).

15. The process of claim 1, wherein said cross-linking is initiated by a chemical initiator selected from the group consisting of organic peroxides and azo compounds.

16. The process of claim 15, wherein the weight fraction of said chemical initiator in said base resin is less than 10 weight percent.

17. The process of claim 1, wherein said melt mixing process is carried out in an extruder.

18. The process of claim 3, comprising preblending said reactive base resin and a chemical initiator to form a preblend, and feeding said preblend, and optionally additional base resin and optionally additional chemical initiator to a continuous melt mixing apparatus.

19. The process of claim 3, comprising feeding said reactive base resin and a chemical initiator separately to a continuous melt mixing apparatus.

20. The process of claim 2, comprising the step of preblending said reactive base resin and a chemical initiator to form a preblend, and feeding said preblend, said base resin and optionally additional chemical initiator to a batch internal melt mixing apparatus.

21. The process of claim 2, comprising feeding said reactive base resin and a chemical initiator separately to a batch internal melt mixing apparatus.

22. The process of claim 1, wherein said low fix temperature toner resin produced by said process is a polyester resin comprising cross-linked portions and linear portions, wherein said cross-linked portions comprise very high molecular weight gel particles with high density cross-linking, wherein said gel particles are less than about 0.1 micron in diameter and are substantially uniformly distributed in said resin, and wherein said linear portions are linear unsaturated polyesters having a number-average molecular weight ($M_n$) as measured by gel permeation chromatography in a range of from about 1000 to about 20,000, a weight-average molecular weight ($M_w$) of from about 2000 to about 40,000, a molecular weight distribution ($M_w/M_n$) of about 1.5 to about 6, an onset glass transition temperature ($T_g$) as measured by differential scanning calorimetry in the range of from about 50° C. to about 70° C., and a melt viscosity as measured with a mechanical spectrometer at 10 radians per second from about 5,000 to about 200,000 poise at 100° C., said melt viscosity dropping with increasing temperature to from about 100 to about 5000 poise at 130° C.

23. The process of claim 1, wherein said low fix temperature toner resin produced by said process is a polyester resin comprising cross-linked portions and linear portions, wherein said cross-linked portions are in the form of microgels less than 0.1 micron in particle diameter and are substantially uniformly distributed in said resin, wherein the amount of cross-linked portions or gel content is in the range from about 0.001 to about 50 percent by weight of said toner resin, wherein the amount of linear portion is in the range of about 50 to about 99.999 percent by weight of said toner resin, and wherein said resin has an onset glass transition temperature in the range from about 50° C. to about 70° C., and melt viscosity at 10 radians per second from about 5,000 to about 200,000 poise at 100° C. and from about 10 to about 20,000 poise at 160° C.

24. The process of claim 29, wherein said toner resin provides a minimum fix temperature of toner of from about 100° C. to about 160° C., a hot offset temperature of toner from about 110° C. to about 220° C. and substantially no vinyl offset.

25. The process of claim 1, wherein substantially all said cross-linking is carried out under high shear.

26. A reactive melt mixing process of preparing low fix temperature toner resin substantially free of sol, comprising the steps of:

(a) melting a reactive base resin, thereby forming a polymer melt; and (b) cross-linking said polymer melt under high shear to form a cross-linked toner resin, said cross-linked toner resin having a cross-linking distance between polymer chains of 0 or 1 atom and being substantially free of sol, wherein substantially all said cross-linking is carried out under high shear.

27. A reactive melt mixing process of preparing low fix temperature toner resin substantially free of sol, comprising the steps of:

(a) melting a reactive base resin, thereby forming a polymer melt; and (b) cross-linking said polymer melt under high shear and without the use of a cross-linking monomer to form a cross-linked toner resin substantially free of sol, wherein substantially all said cross-linking is carried out under high shear.

28. A reactive melt mixing process of preparing low fix temperature toner resin substantially free of sol, comprising the steps of:

(a) melting a reactive base resin, thereby forming a polymer melt; and (b) cross-linking said polymer melt under sufficiently high shear to form a cross-linked toner resin consisting essentially of microgels uniformly dispersed in linear polymer and substantially free of sol.

29. The process of claim 13, wherein said linear unsaturated polyester base resin is prepared from at least one member selected from the group consisting of succinic acid, glutaric acid, adipic acid, pimelic acid, suberic acid, azelaic acid, sebacic acid, isophthalic acid, terephthalic acid, hexachloroendomethylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride and mixtures thereof, in addition to said at least one diacid or anhydride and said at least one diol.

30. The process of claim 26, wherein said cross-linked toner resin consists essentially of cross-linked unsaturated polyester resin.

31. The process of claim 27, wherein said cross-linked toner resin consists essentially of cross-linked unsaturated polyester resin.

32. The process of claim 28, wherein said cross-linked toner resin consists essentially of cross-linked unsaturated polyester resin.

33. The process of claim 1, wherein said cross-linked toner resin consists essentially of cross-linked unsaturated polyester resin.

* * * * *